(No Model.)  2 Sheets—Sheet 1.

E. P. LYNCH.
STALK CUTTING MACHINE.

No. 348,167.  Patented Aug. 24, 1886.

Attest
Sidney P. Hollingsworth
Wm. R. Kennedy

Inventor
E. P. Lynch
By his Atty
Phil. T. Dodge (No Model.)  2 Sheets—Sheet 2.
E. P. LYNCH.
STALK CUTTING MACHINE.
No. 348,167.  Patented Aug. 24, 1886.
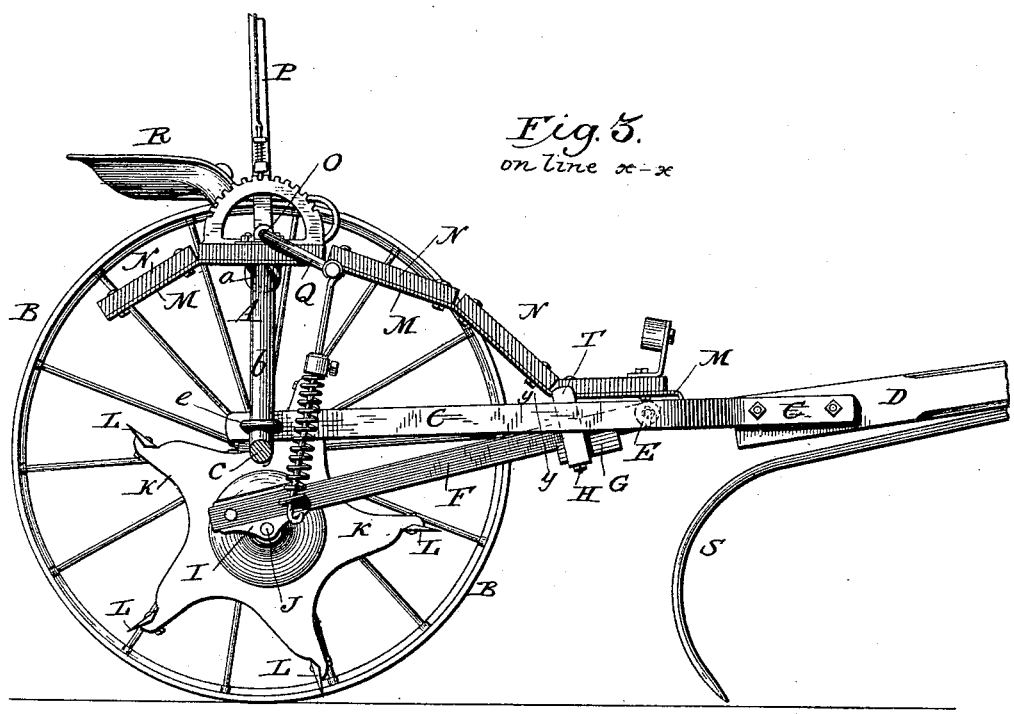
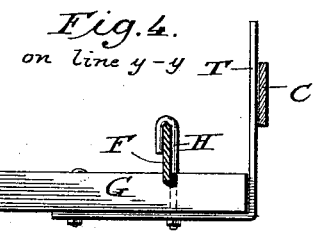
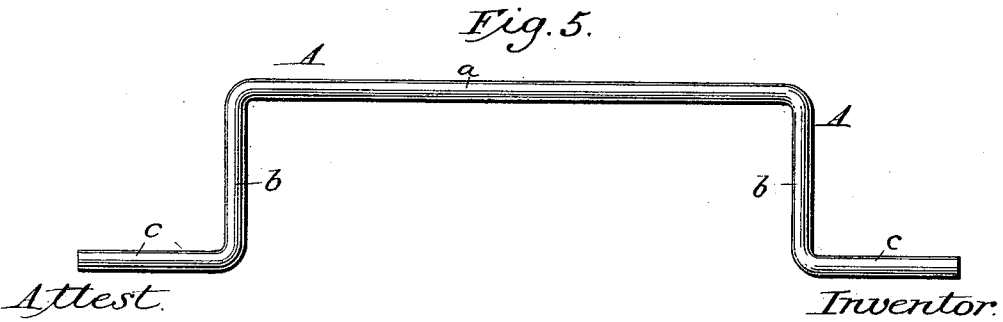
Attest.  Inventor.
Sidney P. Hollingsworth  E. P. Lynch
Wm. L. Kennedy  By his Atty
  P. T. Dodge.

United States Patent Office.

EDWARD P. LYNCH, OF DAVENPORT, IOWA.

STALK-CUTTING MACHINE.

SPECIFICATION forming part of Letters Patent No. 348,167, dated August 24, 1886.

Application filed March 22, 1886. Serial No. 196,148. (No model.)

*To all whom it may concern:*

Be it known that I, EDWARD P. LYNCH, of Davenport, in the county of Scott and State of Iowa, have invented certain Improvements in Stalk-Cutting Machines, of which the following is a specification.

This invention relates to that class of machines in which a revolving frame or cylinder armed with knives is mounted in a vertically-adjustable frame, which is in turn jointed to a wheeled main frame carrying a transverse seat and a lever for effecting the vertical adjustment of the cutter-frame.

The aim of the invention is to simplify the construction, lighten the machine, and improve its operation.

To this end it consists, mainly, in certain improvements in the construction of the main frame, and in the manner of connecting other parts therewith, as hereinafter explained in detail.

Figure 1:
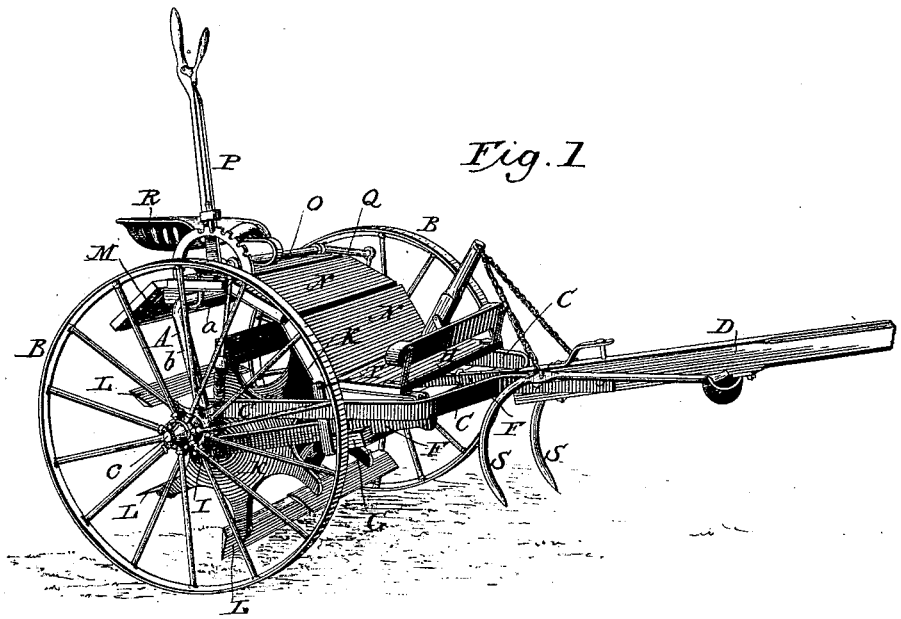
Figure 2:
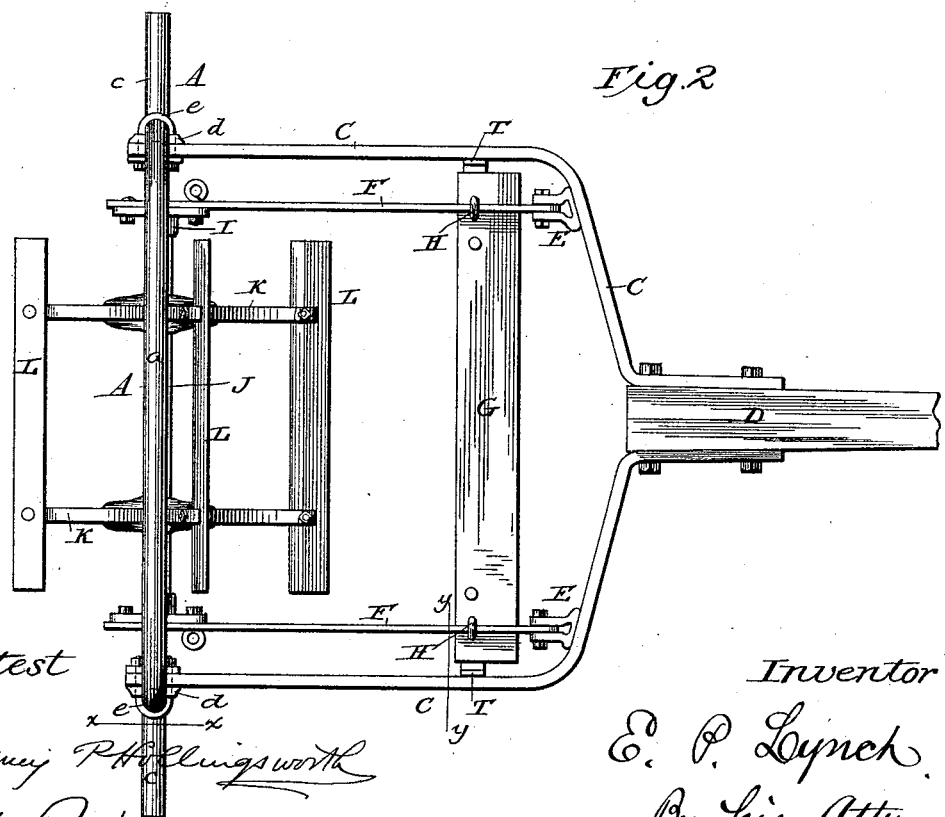

Referring to the accompanying drawings, Figure 1 represents a perspective view of my machine. Fig. 2 is a top plan view of the main frame. Fig. 3 is a sectional elevation of the machine on the line $x\ x$ of Fig. 2. Fig. 4 is a cross-section on the line $y\ y$ of Figs. 2 and 3. Fig. 5 is a rear elevation of the main axle.

In constructing my machine I provide an arched metallic axle, A, such as shown in Fig. 5, consisting of a horizontal elevated portion, $a$, the downwardly-curved arms $b$, and the horizontally-projected ends or journals $c$. The two ends or journals in this axle I mount in ground-wheels B.

To each of the vertical arms $b$, by a cap-plate, $d$, and stirrup-bolts $e$, or in any other suitable manner, I secure the rear end of a metal side bar, C. These two bars are extended forward in a horizontal direction, and curved inward toward each other at the forward end in position to bear against opposite sides of an intermediate tongue or draft-pole, D, to which they are firmly bolted.

The foregoing parts constitute jointly a wheeled main frame, the rear end of which is elevated that it may carry the seat and controlling-lever, and also open at the rear that it may permit the escape of stalks and other matters carried upward by the knives.

To each of the side bars, C, at the forward end, I secure the hinged plate or stirrup E, to which I connect by a horizontal pivot a bar, F, extending rearward. To the under side of the bars F, I apply a cross bar or plank, G, which is grooved to receive the side bars, as shown in Fig. 4, and secured rigidly thereto by bolts H.

The side bars, F, and the cross-bar G, constitute jointly a secondary frame for the support of the rotary cutter. At their rear ends the side bars, F, are provided with boxes or bearings I, which receive and sustain the opposite ends of a transverse axle, J, carrying wheels or spiders K, which in turn carry the transverse cutting blades or knives L.

The shaft spiders and blades constitute jointly a revolving cutter the blades of which are presented in succession upon the stalks lying on the surface of the ground in essentially the same manner as in other machines now in common use.

On each of the side bars, C, at the forward end, I bolt a metal bar, M, which is extended thence rearward and upward to the top of the main axle, to which it is secured. On top of these longitudinal bars M, I secure a series of boards or planks, N, adapted to serve as a shield to protect the operator and the team from the stalks, dirt, and other matters which may be thrown upward by the cutters. In place of this plank, sheet metal or other suitable sheathing may be employed. On the raised portion of the axle or the plank seated thereon, I mount a transverse rock-shaft, O, provided with a hand-lever, P, and with two crank-arms, Q, which latter are connected by spring-links of ordinary construction to side bars, F, of the cutter-frame. This hand-lever is combined with locking devices by which it may be fixed in different positions, and which serves, through the intermediate parts, as a means of elevating the cutter-frame and cutter, and also to apply a downward spring-pressure thereon, when required. This feature is not claimed as of my invention. I also mount on top of the axle or the plank thereon, a seat, R, for the use of the driver, the seat being in such relation to the lever that it may be readily operated when the driver occupies the seat.

At the forward end of the frame I employ turning or swiveling hooks S, of the usual construction.

In order to prevent side play of the arms F, I bolt to each end of the cross-plank G a vertically-extending arm, T, which slides against the inner face of the adjacent main frame-bar C. These arms may be secured to the main frame.

It will be perceived that under my construction the arched axle is made to serve not only as a connection between the side bars of the main frame, but also as a direct support for the transverse seat, the shield, and the adjusting-lever. It will also be perceived that the use of the arched axle leaves the rear end of the main frame entirely open, thus avoiding the danger of the accumulation of stalks, mud, or other obstructions in the rear.

Having thus described my invention, what I claim is—

1. In a stalk-cutter, the main frame consisting of the arched axle, the tongue, and the bent side bars secured at their forward ends rigidly to the tongue and attached at their rear ends rigidly to the upright portion of the axle, whereby they are caused to sustain the axle in an elevated position, and leave an open space thereunder for the admission of the other parts.

2. The main frame consisting of the arched axle, its ground-wheels, the tongue, and the side bars connected rigidly to the tongue and to the upright portions of the axle, in combination with the secondary frame F, jointed to the front end of the main frame, the rotary cutter journaled in the secondary frame, its axis in substantially the same vertical plane as the main axle, and the hand-lever mounted on the arched portion of the axle and connected with the secondary frame, substantially as described, whereby the axle is caused to directly support the other parts and the weight applied principally in line with the wheels, so that the tendency of the machine to tilt forward or backward is avoided.

3. In a stalk-cutter, the arched axle A, provided with wheels at its ends, and the side bars, C, in combination with the secondary frame F, hinged therein, the rotary cutter, the bars M, extending from the side bars to the elevated portion of the axle.

In testimony whereof I hereunto set my hand, this 18th day of December, 1885, in the presence of two attesting witnesses.

EDWARD P. LYNCH.

Witnesses:
T. O. SWINEY,
G. WATSON FRENCH.